F. E. WATTS.
CARBURETER.
APPLICATION FILED JUNE 1, 1914.

1,159,446.

Patented Nov. 9, 1915.

WITNESSES:
James P. Barry
W. K. Ford

INVENTOR
Frank E. Watts
BY
ATTORNEYS

UNITED STATES PATENT OFFICE.

FRANK E. WATTS, OF DETROIT, MICHIGAN, ASSIGNOR TO HUPP MOTOR CAR COMPANY, OF DETROIT, MICHIGAN, A CORPORATION OF MICHIGAN.

CARBURETER.

1,159,446.  Specification of Letters Patent.  Patented Nov. 9, 1915.

Application filed June 1, 1914. Serial No. 842,211.

*To all whom it may concern:*

Be it known that I, FRANK E. WATTS, a citizen of the United States of America, residing at Detroit, in the county of Wayne and State of Michigan, have invented certain new and useful Improvements in Carbureters, of which the following is a specification, reference being had therein to the accompanying drawings.

The invention relates to carbureters, and resides in the novel manner of pre-heating the air supplied to the carbureter, in the peculiar relation of the carbureter to the engine, and in the novel construction, arrangement and combination of certain parts as will more fully hereinafter appear.

Figure 1:
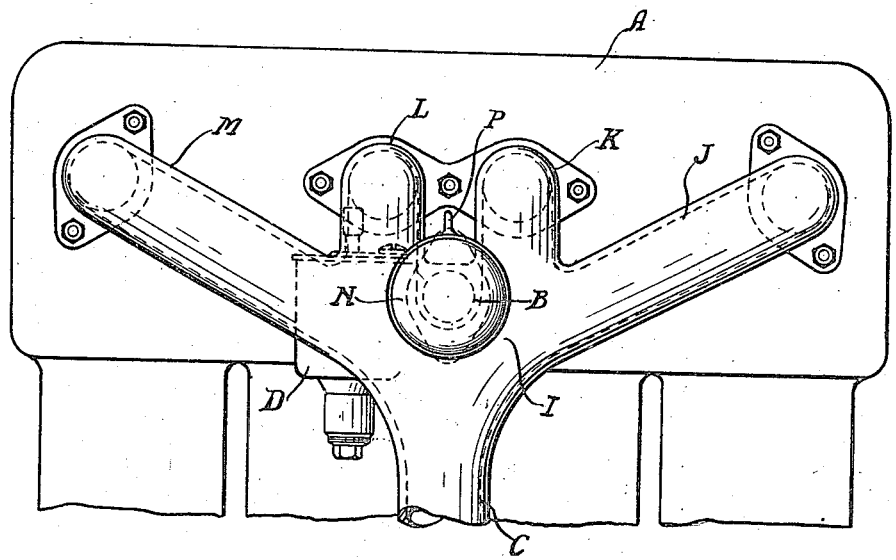
Figure 2:
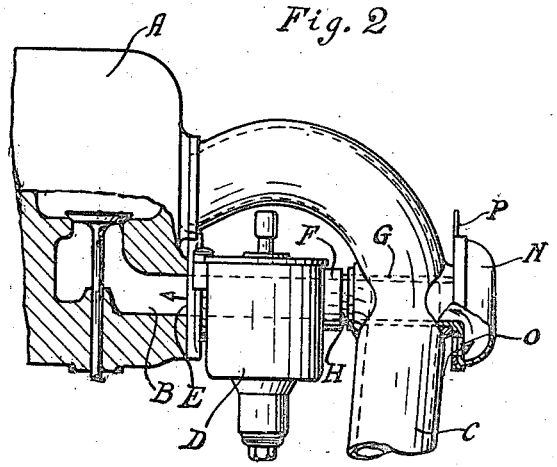

In the drawings, Figure 1 is a side elevation of the structure embodying the invention; Fig. 2 is a plan view.

A designates the engine casing, B the induction conduit or manifold, and C the exhaust conduit.

D is the carbureter having the outlet E communicating with the induction conduit, and F is the air inlet conduit for the carbureter.

Various constructions have been employed to utilize the heat of the exhaust conduit for pre-heating the air supplied to the carbureter, but I have devised a simple and efficient arrangement and construction for accomplishing this result. Thus the air inlet conduit F for the carbureter is extended through the exhaust conduit and preferably is cast integral therewith. In the structure shown the carbureter, which is of the horizontal type, is positioned intermediate the exhaust conduit and the engine casing. This not only utilizes the heat of the engine and the exhaust conduit, but permits the carbureter outlet to be attached directly to the engine casing while the air inlet G for the carbureter may be attached directly to the end H of the air inlet conduit F. Preferably the conduit F extends through the exhaust conduit at the junction I of the several branches J, K, L and M thereof, and the outer end provided with an enlarged chamber N having on the inner face a plurality of apertures O which are controlled by a valve P.

What I claim as my invention is:—

1. The combination of an engine casing and the exhaust conduit, an induction conduit for the engine, a carbureter arranged intermediate the casing and the exhaust conduit having its outlet connected to the inlet of the induction conduit, and an air inlet conduit connected to the air inlet of the carbureter and extending through the exhaust conduit.

2. The combination of an engine casing and the exhaust conduit, an induction conduit for the engine, a carbureter arranged intermediate the casing and the exhaust conduit having its outlet connected to the inlet of the induction conduit, an air inlet conduit connected to the air inlet of the carbureter and extending through the exhaust conduit, and a valve controlling the inlet of the air inlet conduit.

3. The combination with the exhaust manifold of an explosive engine, the same being formed with a plurality of branches leading to a common juncture, and with an air passage at the juncture of the branches, of a carbureter at one side of the manifold having its air intake in communication with said air passage, and a valve mounted upon the other side of the manifold controlling the air inlet of said passage.

4. The combination with an engine casing and a branched exhaust manifold, said casing being formed with an induction conduit, of a carbureter disposed intermediate the casing and exhaust manifold having its outlet connected to the induction inlet, and an air supply conduit for the carbureter communicating with one end of an air passage formed in the exhaust manifold at the juncture of the branches, the other end of said passage being open.

5. The combination with an engine casing and a branched exhaust manifold, said casing being formed with an induction conduit, of a carbureter disposed intermediate the casing and exhaust manifold having its outlet connected to the induction inlet, an air supply conduit for the carbureter communicating with one end of an air passage formed in the exhaust manifold at the juncture of the branches, the other end of said passage being open, and means for regulating the volume of air entering said air passage.

6. The combination with an engine casing and the exhaust manifold thereof, the casing being formed with an induction conduit and the manifold having a plurality of branches leading to a common juncture, and having an air passage at the juncture of said branches substantially alined with the inlet of the induction conduit, of a carbureter having communication with said air passage and with the induction conduit, disposed intermediate the casing and the exhaust manifold.

In testimony whereof I affix my signature in presence of two witnesses.

FRANK E. WATTS.

Witnesses:
WM. A. GIBSON,
DON T. HASTINGS.

Copies of this patent may be obtained for five cents each, by addressing the "Commissioner of Patents, Washington, D. C."